United States Patent [19]

Levesque

[11] 4,083,237
[45] Apr. 11, 1978

[54] DIFFERENTIAL RELUCTANCE MOTION DETECTOR

[75] Inventor: Peter S. Levesque, Jenkintown, Pa.
[73] Assignee: Fischer & Porter Co., Warminster, Pa.
[21] Appl. No.: 770,776
[22] Filed: Feb. 22, 1977
[51] Int. Cl.$^2$ ............................................. G01L 5/00
[52] U.S. Cl. .................................. 73/141 R; 73/497; 340/199
[58] Field of Search ............... 73/141 R, 497; 323/48, 323/51; 340/199

[56] References Cited
U.S. PATENT DOCUMENTS

| 3,185,973 | 5/1965 | Garber | 340/199 |
| 3,225,289 | 12/1965 | Koppel et al. | 340/199 X |
| 3,456,132 | 7/1969 | Dechelotte | 323/51 X |
| 3,555,405 | 1/1971 | Martin | 323/51 |

*Primary Examiner*—James J. Gill

[57] ABSTRACT

A displacement detector yielding an electrical output signal that is linearly proportional to the extent of input motion. The input motion to be monitored is applied to the shiftable armature of a differential reluctance transducer constituted by a pair of transformers, each having a primary, a main secondary and an auxiliary secondary. Fed to the primaries is a high-frequency drive voltage generated by an oscillator whose amplitude is regulated by a feedback loop in which a feedback voltage taken from the auxiliary secondaries is compared with a reference voltage to provide a control voltage that so regulates the drive voltage oscillator as to cancel out the effect of temperature on the output signal derived from the main secondaries.

5 Claims, 6 Drawing Figures

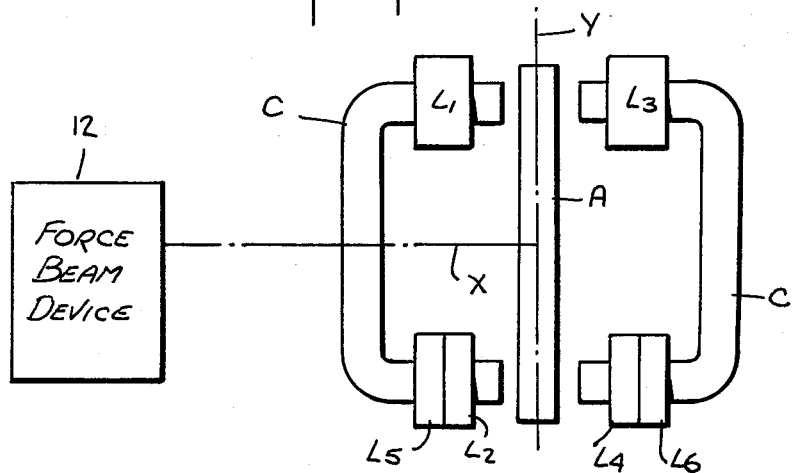
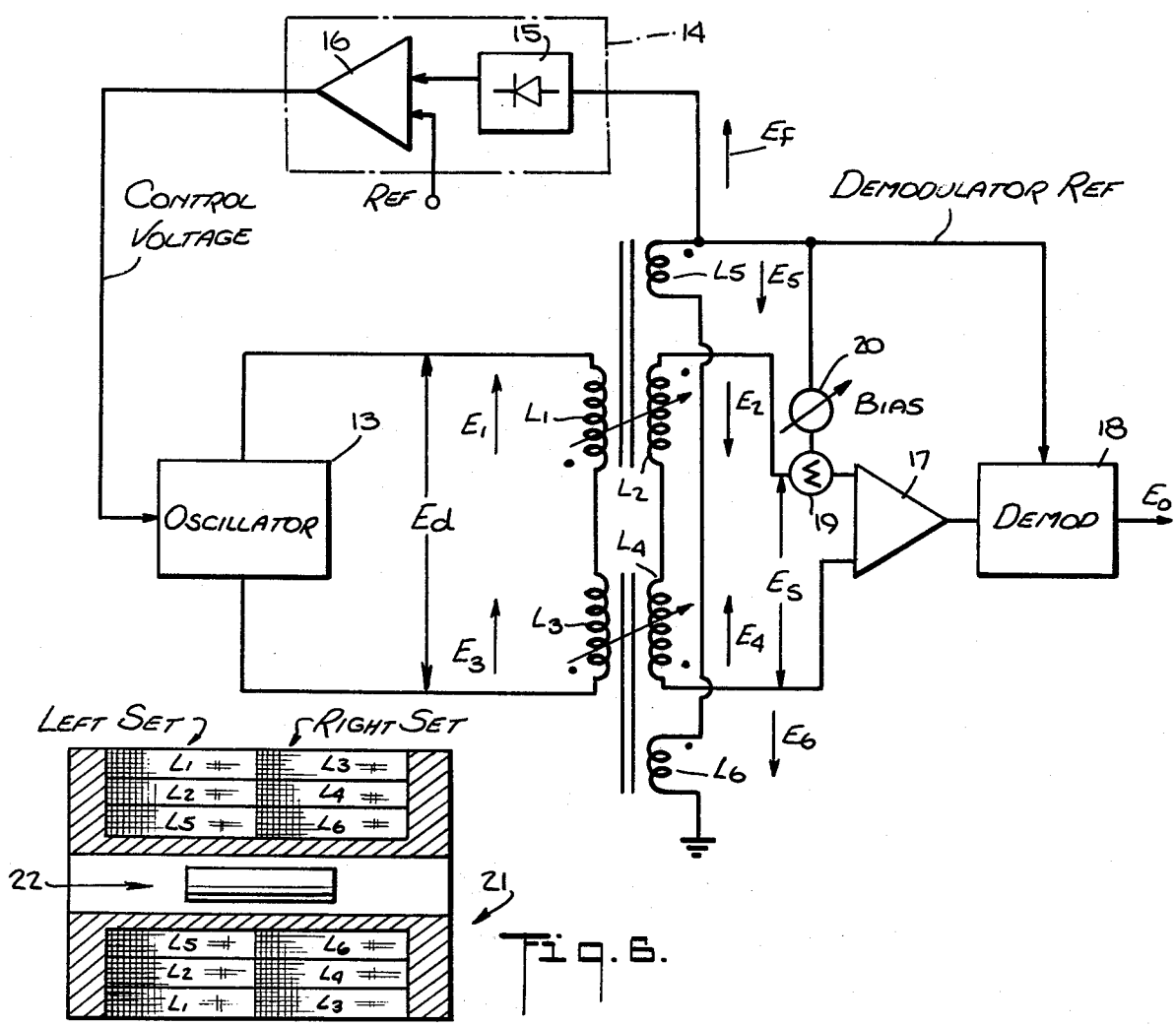

DIFFERENTIAL RELUCTANCE MOTION DETECTOR

BACKGROUND OF INVENTION

This invention relates generally to motion detectors for producing an electrical signal whose value depends on the degree of displacement, and more particularly to a differential reluctance displacement transducer system which is highly stable and yields a signal that is linearly proportional to input motion.

For measuring small displacement in the order of 0.1 inches, use is often made of a linear or differential transformer in which a core associated with a single primary and a pair of secondaries is longitudinally displaced by the motion to be monitored. While such transformers are effective as motion detectors in metering small displacements, they are not sufficiently sensitive and stable to afford accurate measurement for minute displacements in the milli or microinch range.

Thus when a motion detector is required to measure the displacement of a force beam operating on the open-loop principle, the detector must be capable of sensing the slightest beam movement to produce a signal that is linearly related thereto. The 1976 patent to Kazahaya, U.S. Pat. No. 3,968,693, discloses an open-loop differential pressure transmitter that is adapted to monitor various process variables, such as flow rate or liquid level by means of a pivotally-mounted force beam. Applied to the lower end of the force beam is an input force causing the beam to deflect to an extent depending on the variable being sensed. Operatively coupled to the upper end of the beam is a motion detector serving to convert the beam deflection to a corresponding signal suitable for transmission to a remote station.

An acceptable motion detector for this purpose is the standard differential reluctance transducer, for this is highly sensitive to the slightest motion. A transducer of this type is constituted by a pair of identical transformers, each having a U-shaped core on one leg of which is wound the primary, and on the other the secondary. The transformers are symmetrically arranged with the poles of the cores of the transformers facing each other. An armature is disposed in the space between the poles.

The armature of a differential reluctance transducer is operatively coupled to an element whose displacement is to be measured, the armature being shifted laterally from its neutral position toward the poles of the first transformer and away from the other to an extent in accordance with input motion. As the armature is so shifted, the reluctance in the magnetic circuit in one of the transformers increases while a corresponding decrease takes place in the magnetic circuit in the other.

Applied to the primaries of both transformers is a high-frequency drive voltage, thereby inducing voltages in the secondaries whose amplitudes depend on the turns ratio and the coupling coefficient (coupling factor). The voltages yielded by the secondaries are equal only at the neutral position of the armature. By connecting the secondaries in series opposition, a zero output is developed at the neutral position, the differential output rising above zero as the armature is shifted from its neutral position. Any offset of the operating range from the neutral position is referred to as bias.

Under ideal stable conditions with a zero winding resistance, a constant drive voltage and a constant operating temperature, the output of a differential reluctance transducer is linearly related to displacement. But while it is known to provide regulation for the drive voltage, with existing types of such transducers under finite winding resistance and changing temperature conditions, the relationship between the input displacement and the output signal is unstable and non-linear.

SUMMARY OF INVENTION

In view of the foregoing, the main object of this invention is to provide an improved and stable differential reluctance transducer system which is highly sensitive to small displacement.

More particularly, it is an object of this invention to provide a system of the above type in which the differential reluctance transducer is formed by two transformers each having the usual primary and secondary and further including an auxiliary secondary to produce a feedback voltage to regulate the high-frequency drive voltage applied to the primaries.

Among the advantages of a system in accordance with the invention are the following:

A Improved linearity of the output signal as a function of motion input.

B Improved stability in the relationship between the output signal and motion input.

C Improved stability in the biasing adjustment.

Briefly stated, in a motion detecting system in accordance with the invention, the input motion to be monitored is applied to the shiftable armature of a differential reluctance transducer constituted by a pair of transformers each having a primary, a main secondary and an auxiliary secondary.

Applied to the primaries of the transformers is a high-frequency drive voltage generated by an oscillator whose amplitude is regulated by a feedback loop from the auxiliary secondaries. The voltages induced in the main secondaries, which are connected in series opposition, produce an output signal in accordance with the difference between these voltages.

In the conventional differential reluctance transducer arrangement, the output signal is a function not only of input motion but also depends on the effective drive voltage and the coupling factor of the transformers. With changes in temperature, the resistance of the primaries undergoes a change, as a consequence of which the effective drive voltage also changes. Moreover, a change in temperature results in a change in the coupling factor, so that the output signal then becomes temperature-dependent. And since the inductances of the primaries change in accordance with input motion, the drive current through these coils is altered and the change in drive current by reason of the coil resistances causes a corresponding change in effective drive voltage, this resulting in a non-linear relationship between the output signal and the extent of input motion.

But in the system in accordance with the invention, the auxiliary secondaries are connected in series coincidence to produce a feedback voltage, this voltage being applied to a regulator which compares the feedback voltage with a reference voltage to produce a control voltage which is applied to the oscillator to regulte the amplitude of the drive voltage for the transformer.

The feedback voltage derived from the auxiliary secondaries is subject to the same temperature-dependent variables which influence the output signal derived from the main secondaries. Thus the feedback voltage varies with the changing primary coil resistances and the changing coupling factor. The effect of these variables is cancelled by the feedback regulator, and the output signal is no longer temperature-dependent and becomes a linear function of the input motion and of the reference voltage.

OUTLINE OF DRAWINGS

For a better understanding of the invention as well as other objects and further features thereof, reference is made to the following detailed description to be read in conjunction with the accompanying drawings, wherein.

FIG. 4 schematically illustrates an improved differential reluctance transducer in accordance with the invention; and FIG. 5 is the circuit diagram of a system which incorporates the improved transducer in accordance with the invention; and FIG. 6 schematically illustrates an LVDT type transducer in accordance with the invention.

DESCRIPTION OF INVENTION

Prior Art Arrangement

Figure 1:
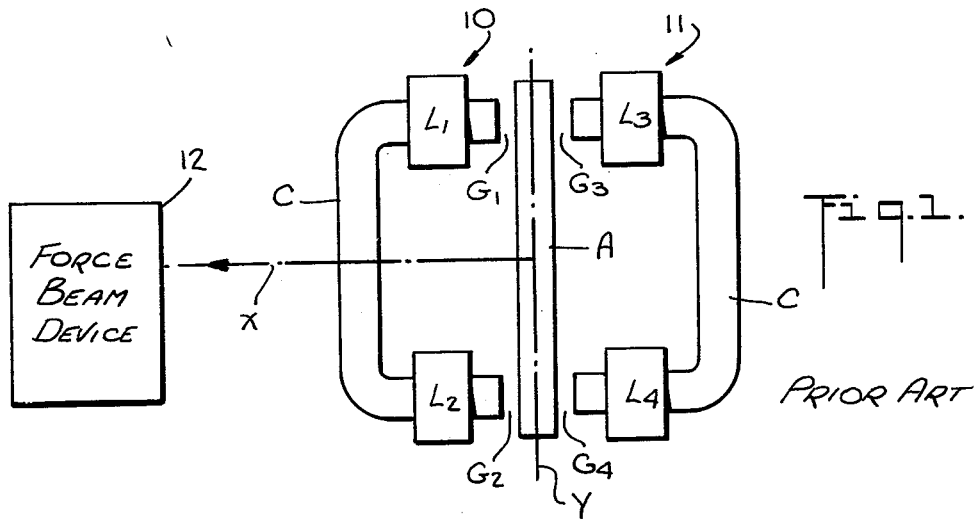
FIG. 1 illustrates schematically a standard differential reluctance transducer.
Figure 2:
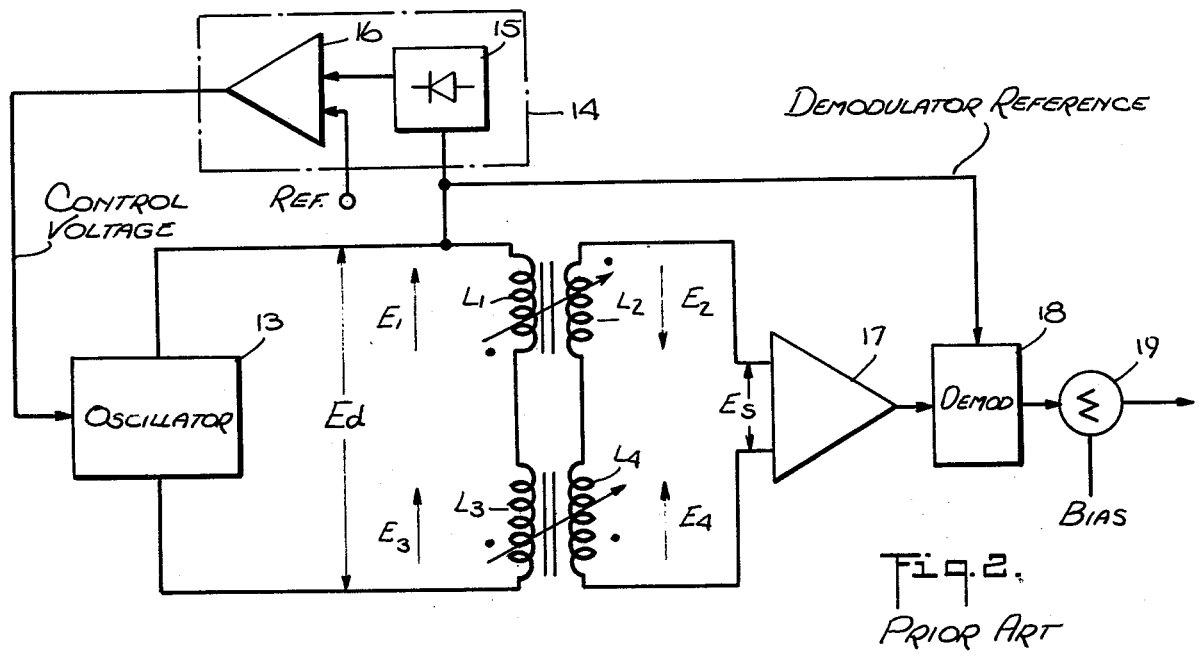
FIG. 2 shows a conventional motion detector system which incorporates the standard transducer.

Referring now to FIGS. 1 and 2, there is shown a standard differential reluctance transducer system constituted by a pair of transformers 10 and 11, each having a U-shaped core C, on one leg of which is wound a primary, and on the other a secondary. Thus core C of transformer 10 is provided with a primary $L_1$ and a secondary $L_2$, while core C of transformer 11 is provided with a primary $L_3$ and a secondary $L_4$.

Transformers 10 and 11 are symmetrically disposed with respect to a laterally-shiftable armature A which in its neutral position on axis Y lies midway between the poles of the cores which face each other. Armature A defines with core C of transformer 10 a magnetic circuit having air gaps $G_1$ and $G_2$ at the poles of this core, the same armature defining with core C of transformer 11 a magnetic circuit having air gaps $G_3$ and $G_4$.

Armature A is operatively coupled to a displaceable element 12 whose motion is to be monitored. By way of illustration, this element is the force beam of the open-loop differential pressure transmitter disclosed in the above-noted Kazahaya U.S. Pat. No. 3,968,693. The standard motion detector, under ideal conditions, serves to produce an output signal that is linearly proportional to the deflection of the force beam.

The deflection of the force beam effects a lateral shift of armature A from its neutral position midway between the poles of cores C of transformers 10 and 11 toward the poles of core C of transformers 10 and away from the poles of core C of transformer 11 to an extent depending on the degree of deflection, which in turn depends on the variable being sensed by the force beam. The transducer is by no means limited to this application and may be used wherever it is necessary to generate a signal which is proportional to a displacement, particularly where the displacement is very slight and within a narrow range.

As shown in FIG. 2, applied to primaries $L_1$ and $L_3$ of transformers 10 and 11, which are connected in series, is a drive voltage $E_d$ produced by a high-frequency oscillator 13 (i.e., 5 kHz). Secondaries $L_2$ and $L_4$ are connected in series opposition, and the voltages induced therein are combined differentially to produce a transducer signal $E_s$. When armature A is at its neutral position, the voltages induced in secondaries $L_2$ and $L_4$ are equal, as a consequence of which a zero output signal is yielded by the transducer.

But when armature A is shifted toward core C of transformer 10 in accordance with the input motion, thereby narrowing air gaps $G_1$ and $G_2$ and concurrently enlarging air gaps $G_3$ and $G_4$, the voltages induced in the main secondaries $L_2$ and $L_4$ are different to a degree depending on the extent of input motion to produce an output signal which reflects this difference.

Associated with oscillator 13 for the purpose of regulating the amplitude of drive voltage $E_d$ is a feedback loop including a regulator 14 constituted by a demodulator 15 and a differential amplifier 16. Demodulator 15, which is connected to the output of oscillator 13, rectifies the a-c output thereof to produce a d-c analog value which is compared in differential amplifier 16 with a reference voltage REF. Amplifier 16 yields a control voltage which is fed to the input of oscillator 13 and acts to minimize the difference between the analog value and the reference voltage as in a conventional regulating loop, thereby stabilizing drive voltage $E_d$.

Voltage $E_s$ from the output of the transducer is applied to an amplifier 17 and then demodulated in a synchronous demodulator 18 whose output is applied to a summing device 19 where it is summed with a bias to produce an output signal $E_o$. Applied as a reference to demodulator 18 is an a-c voltage taken from the output of oscillator 13.

For a rectifier gain of Q and a very high amplifier gain, the following equation is applicable to drive voltage $E_d$:

$$E_d = REF/Q$$

Voltage $E_2$ across secondary $L_2$ of transformer 10 is a function of voltage $E_1$ across primary $L_1$ of this transformer as well as the turns ratio and the coupling coefficient thereof. Hence:

$$E_2 = E_1 k;$$

where $k$ is a constant representing the turns ratio combined with the coupling coefficient.

Similarly, with respect to transformer 11 in which voltage $E_4$ across secondary $L_4$ is a function of voltage $E_3$ across primary $L_3$, the equation is $E_4 = E_3 k$.

Voltages $E_1$ and $E_3$ across primaries $L_1$ and $L_3$ of the transformers are proportional to the inductances of these coils. Hence:

$$E_1 = \frac{L_1}{L_1 + L_3} E_d$$

$$E_3 = \frac{L_3}{L_1 + L_3} E_d$$

Voltages $E_2$ and $E_4$ across secondaries $L_2$ and $L_4$ depend on the $k$ factor of the transformers. Hence:

$$E_2 = \frac{L_1}{L_1 + L_3} k E_d$$

$$E_4 = \frac{L_3}{L_1 + L_3} k E_d$$

Inasmuch as secondaries $L_2$ and $L_4$ are connected in series opposition, voltage $E_s$ developed across this series circuit is expressed as follows:

$$E_s = E_d k \frac{L_1 - L_3}{L_1 + L_3} \qquad \text{Equation (a)}$$

If the magnetic reluctance of armature A plus core C is represented as $R_1$, and the reluctance of the air gaps $G_1$ plus $G_2$ for primary $L_1$ is defined as $R_g$, then the inductance of $L_1$ is:

$$L_1 = \frac{N_1^2}{R_1 + R_g};$$

where $N_1$ is the number of turns of primary $L_1$.

The reluctance of gaps $G_1$ plus $G_2$ is proportional to the length of these gaps. Hence:

$$L_1 = \frac{N_1^2}{R_1 + R_o \frac{(g_o - x)}{g_o}}$$

Where:
$R_o$ is the reluctance of the gap when the armature is in the center position; $g_o$ is the magnitude of the gap when the armature is in the center position; $x$ is the lateral displacement of the armature.

By defining inductance $L_o$ as the inductance of primary $L_1$ when gap $G_1$ has the value $g_0$, the inductance of $L_1$ may be expressed as follows:

$$L_1 = L_o \frac{g_o}{g_o - x}; \qquad \text{Equation (b)}$$

where $x$ is the displacement of armature A from its neutral or center position.
Similarly:

$$L_3 = L_o \frac{g_o}{g_o + x} \qquad \text{Equation (c)}$$

By combining equations (a), (b) and (c), the value for voltage $E_s$ is expressed as follows:

$$E_2 = E_d k \frac{\left(\frac{L_o g_o}{g_o - x}\right) - \left(\frac{L_o g_o}{g_o + x}\right)}{\left(\frac{L_o g_o}{g_o - x}\right) + \left(\frac{L_o g_o}{g_o + x}\right)}$$

This immediately reduces to:

$$E_s = E_d k \frac{\left(\frac{1}{g_o - x}\right) - \left(\frac{1}{g_o + x}\right)}{\left(\frac{1}{g_o - x}\right) + \left(\frac{1}{g_o + x}\right)} \qquad \text{Equation (d)}$$

$$= E_d k \frac{(g_o + x) - (g_o - x)}{(g_o + x) + (g_o - x)}$$

$$= E_d k \left(\frac{x}{g_o}\right)$$

It will be evident that equation (d) is linear with respect to $x$.

Voltage $E_s$ is amplified in amplifier 17 having a gain G. The gain of synchronous demodulator 18 is $\cos \theta$, where $\theta$ is the angle between the demodulator reference and the signal applied thereto.

Thus the output $E_o$ from summing device 19 as a function of input motion $x$ may be expressed as:

$$E_o = E_d k \cos \theta \, G \left(\frac{x}{g_o}\right) + \text{Bias}$$

Figure 3:
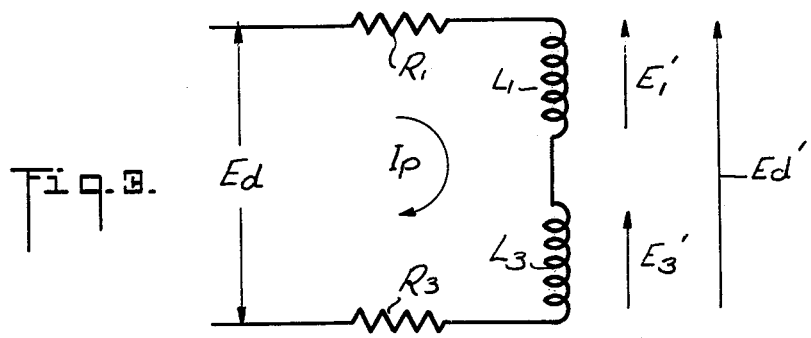
FIG. 3 is the primary drive circuit of the conventional system.

In the above, the characteristics of the differential reluctance transducer have been derived for primaries having zero resistance. However, a factor must next be added to account for the effect of the coil resistances. In FIG. 3, the resistance of primary $L_1$ is represented by resistor $R_1$ and that of primary $L_3$ by resistor $R_3$. Applied to the series-connected primaries $L_1$ and $L_3$ is drive voltage $E_d$, thereby producing a primary current $I_p$. The effective drive voltage $E_d'$ developed across the primary is therefor:

$$E_d' = E_d \frac{X_L}{X_L + R};$$

where $X_L$ and R are the total inductive and resistance reactances. As a function of displacement $x$, the reactance $X_L$ may be written as:

$$X_L = X_o \left(\frac{g_o}{g_o - x} + \frac{g_o}{g_o + x}\right)$$

which is clearly a function of $x$.

It will be seen, therefore, that the dependency of effective voltage $E'_d$ on input displacement $x$ gives rise to a non-linearity in the output signal $E_o$ as a function of input displacement.

In an experimental detector in which the value $X_L = 100k$, $Q = 100$ and $3x = g_o$, the effective drive voltage $E_d'$ was found to vary by approximately 2%. The relationship between $E_s$ and $E_s'$ may therefore be written for this particular case as:

$$E_s' = E_s \left(.98 + .06 \frac{x}{g_o}\right);$$

When $x$ varies between 0 and $g_o/3$, the complete expression for output signal $E_o$, including the effect of coil resistance, becomes:

$$E_o = \left[0.98 + \frac{.06x}{g_o}\right] \frac{REF}{Q} k \cos \theta \, G \frac{x}{g_o}$$

Thus with a conventional motion detector making use of a standard differential reluctance transducer, the detector is unstable, and the relationship between input motion and output signal is lacking in linearity.

The New System

Referring now to FIG. 4, there is shown a differential reluctance transducer in accordance with the invention. This transducer differs from a standard transducer of the type shown in FIG. 1, only in that in addition to the usual primaries $L_1$ and $L_3$ and secondaries $L_2$ and $L_4$, the transducer is provided with auxiliary secondaries $L_5$ and $L_6$. In practice, auxiliary secondary $L_5$ is wound over the main secondary $L_2$, and auxiliary secondary $L_6$ is wound over main secondary $L_4$.

As shown in FIG. 5, the main secondaries are connected in series opposition to produce a transducer output voltage $E_s$ which depends on the difference between secondary voltages $E_2$ and $E_4$, whereas the auxiliary secondaries are connected in series coincidence to provide a feedback voltage $E_f$ which is the sum of the voltages developed across the auxiliary secondaries.

Thus in operation when armature A is at its center or neutral position, voltages $E_2$ and $E_4$ developed across the main secondaries are equal and opposite and therefore cancel or balance out to provide a zero transducer output voltage $E_s$. But at the neutral position of armature A, the voltages induced across the feedback coils (auxiliary secondaries $L_5$ and $L_6$) are added to provide a feedback voltage $E_f$ which is the sum of these voltages and depends on the transformer coupling factors.

When, therefore, armature A is laterally displaced as a function of input motion, the voltage induced in one main secondary and in its associated auxiliary secondary decreases while the voltage induced in the other main secondary and its associated auxiliary secondary correspondingly increases. But since the main secondaries are connected in series opposition, the difference in the outputs thereof results in a transducer output voltage $E_s$ which rises in accordance with the extent of displacement, whereas the feedback voltage in the absence of those factors which result in non-linearities in this output remains unchanged.

Though at the neutral position of the armature the two auxiliary secondary voltages are equal and are summed to provide a feedback voltage which is twice that across either auxiliary secondary, as the armature is shifted this causes one auxiliary secondary voltage to go up while the other goes down to the same extent, as a consequence of which the sum remains unchanged. However, since the feedback $E_f$ voltage actually reflects the same non-linearities which affect the transducer output voltage $E_s$, changes in the feedback voltage serve to effect regulation of the magnitude of drive voltage $E_d$ to cancel out these non-linearities.

In a system in accordance with the invention, feedback voltage $E_f$ is applied to demodulator 15 of regulator 14 in the feedback loop where it is compared in amplifier 16 with a reference voltage REF to produce a d-c control voltage which is applied to oscillator 13 to regulate a-c drive voltage $E_d$ produced thereby. Feedback voltage $E_f$ is also applied as a reference to demodulator 18 connected to the output of amplifier 17. The input to amplifier 17 is taken from the output $E_s$ of the main secondaries $L_2$ and $L_4$ which is applied through summing device 19 to which is applied an adjustable bias 20 also taken from feedback voltage $E_f$.

To demonstrate how this system operates, we shall assume that the ratio of turns of main secondary $L_2$ to auxiliary secondary $L_5$ is M (in an experimental model M = 1). Similarly, the ratio of turns of main secondary $L_4$ to auxiliary secondary $L_6$ is M. Hence the voltage across auxiliary secondary $L_5$ is $E_5 = (M) E_2$, and the voltage across $L_6$ is $E_6 = (M) E_4$. The feedback voltage is $E_f = E_5 + E_6$.

As earlier derived, the transducer output voltage $E_s$ is given by:

$$E_s = E_d' k \frac{x}{g_o} + \text{Bias } E_f$$

Similarly, feedback voltage $E_f$ is:

$$E_f = E_d' k \frac{g_o}{g_o} M = E_d' k M$$

Since $E_f$ is demodulated by synchronous demodulator 15 having the same phase relationship to the signal as the demodulator 18 which is responsive to the difference signal $E_s$ from the main secondaries, the regulator feedback loop performs the function:

$$E_d' km \cos \theta = REF$$

Substituting $E_d'$ into the expression for voltage $E_s$ yields:

$$E_s = \frac{REF}{Mk \cos \theta} k \frac{x}{g_o} + \text{Bias} \frac{REF \, k}{Mk \cos \theta}$$

When amplified by a gain G, the amplification gain of amplifier 17 and demodulated by demodulator 18 having a gain $\cos \theta$, yields:

$$E_5 = G \frac{REF}{M} \frac{x}{g_o} + \text{Bias}$$

This expression is linear with respect to input motion x and is independent of any variation in $\cos \theta$ or k. Also, bias may be provided as a simple attenuation network and is scaled directly to input motion x independent of other coefficients.

In practice, the system may be operated from a d-c voltage supply through a voltage regulator which supplies operating voltage for the oscillator as well as the amplifiers and all other active elements of the system and also provides a reference for the regulator amplifier 16 in the feedback loop.

A New LVDT Arrangement

The principles disclosed are also applicable to a linear variable differential transformer (LVDT). In a conventional transformer of this type which converts physical motion into an output voltage whose amplitude and phase are proportional to position, a movable iron core is positioned between two secondary windings associated with a common primary. Displacement of the core from its null position causes the voltage in one secondary to increase while simultaneously reducing the voltage in the other secondary. The difference between these two voltages varies with linear position.

In the LVDT arrangement disclosed in FIG. 6, the coils of the motion-responsive transformer are wound on a bobbin 21 provided with a movable core 22 which is movable axially with respect to two sets of coils. The set on the left is composed of a primary $L_1$, a main secondary $L_2$ and an auxiliary secondary $L_5$ wound over main secondary $L_2$ (or the other way around). The set on the right is composed of a primary $L_3$, a main secondary $L_4$ and an auxiliary secondary $L_6$ wound over main secondary $L_4$. The circuit arrangement associated with this transformer is essentially the same as that in FIG. 5 and has comparable advantages. Since primaries $L_1$ and $L_3$ are wound in the same direction and are connected in series coincidence, in practice, these primaries may be formed by a single winding.

While there has been shown and described a preferred embodiment of a differential reluctance transducer system in accordance with the invention, it will be appreciated that many changes and modifications may be made therein without, however, departing from the essential spirit thereof.

I claim:

1. A displacement detecting system yielding an electrical output signal that is linearly proportional to the extent of an applied input motion, said system comprising:
    A a differential reluctance motion transducer having a pair of symmetrically arranged transformers, each having a core, a primary, a main secondary and an auxiliary secondary, and an armature laterally movable in accordance with said input motion from a neutral position between the cores to a position toward one of the cores and away from the other;
    B an oscillator generating a high-frequency a-c drive voltage which is applied to the primary of each transformer to cause an excitation current to flow therein which is a function of the position of said armature, said excitation current causing a voltage to be induced in said main and auxiliary secondaries which is a function of the inductance of the primary of each transformer as well as the coupling coefficient between the primary and secondaries thereof, the induced voltage being a function of said excitation current and giving rise to a non-linear relationship between the motion of said armature and the induced voltage; and
    C means to reduce said non-linear relationship including a feedback loop having a regulator comparing a feedback voltage derived from said auxiliary secondaries connected in series coincidence with a reference voltage to produce a control voltage which is applied to said oscillator to regulate said drive voltage.

2. A system as set forth in claim 1, wherein said main secondaries are connected in series opposition to produce a transducer output voltage depending on the difference between the voltages yielded by the main secondaries.

3. A system as set forth in claim 2, wherein said transducer output voltage is applied to a demodulator.

4. A system as set forth in claim 3, wherein said feedback voltage is also applied as a reference to said demodulator.

5. A system as set forth in claim 1 wherein said regulator is constituted by a demodulator which rectifies said feedback voltage and applies it to a differential amplifier in which the rectified feedback voltage is compared with said reference voltage to produce said control voltage.

* * * * *